United States Patent
Roh

(10) Patent No.: US 8,743,946 B2
(45) Date of Patent: Jun. 3, 2014

(54) FREQUENCY-DOMAIN EQUALIZATION AND COMBINING FOR SINGLE CARRIER TRANSMISSION

(75) Inventor: June Chul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/607,253

(22) Filed: Sep. 7, 2012

(65) Prior Publication Data

US 2013/0064282 A1 Mar. 14, 2013

Related U.S. Application Data

(60) Provisional application No. 61/532,289, filed on Sep. 8, 2011.

(51) Int. Cl.
*H03H 7/30* (2006.01)
(52) U.S. Cl.
USPC ........... 375/234; 375/229; 375/230; 375/231; 375/232; 375/233
(58) Field of Classification Search
CPC .......... H04L 25/03008; H04L 25/03057; H04L 2025/03477; H04L 2025/03617; H04L 2025/03503; H04L 25/03038; H04L 25/03044; H04L 2025/03509; H04L 2025/0349; H04L 27/01; H04L 25/038885; H04L 25/03159; H04L 25/03019; H04L 25/03133; H03H 21/0012; G11B 20/10009
USPC .................. 375/234, 229, 230, 231, 232, 233
See application file for complete search history.

(56) References Cited

U.S. PATENT DOCUMENTS

| | | | | |
|---|---|---|---|---|
| 5,751,768 A | * | 5/1998 | Guglielmi et al. | 375/234 |
| 2012/0294350 A1 | * | 11/2012 | Allpress et al. | 375/229 |
| 2013/0128995 A1 | * | 5/2013 | Mittelsteadt et al. | 375/260 |

* cited by examiner

*Primary Examiner* — Dhaval Patel
(74) *Attorney, Agent, or Firm* — Steven A. Shaw; Wade James Brady, III; Frederick J. Telecky, Jr.

(57) ABSTRACT

A communication receiver including a time domain receive filter to provide a filtered output, the filtered output including colored noise. The receiver also includes a frequency domain, fractionally-spaced equalizer (FSE) unit to receive the filtered output from the receive filter. The FSE unit determines a separate weighting factor for each subcarrier, and the weighting factor is determined based on a noise variance of the subcarrier.

32 Claims, 2 Drawing Sheets

FREQUENCY-DOMAIN EQUALIZATION AND COMBINING FOR SINGLE CARRIER TRANSMISSION

CROSS-REFERENCE TO RELATED APPLICATION

The present application claims priority to U.S. Provisional Patent Application No. 61/532,289 filed on Sep. 8, 2011 which is incorporated herein by reference.

BACKGROUND

In digital communications, due to noise and other effects the symbols that are received by a receiver have been modified by the communication channel itself. The effect of the channel is convolutional. Often, communication receivers include equalization to undo the effects of the channel. Equalizers may be frequency-domain equalizers or time-domain equalizers.

Single carrier transmission with frequency-domain equalization (SC-FDE) has a desirable combination of advantages of single carrier systems (e.g., low peak to average power ratio (PAPR)) and multi carrier systems (e.g., low receiver complexity).

SUMMARY

Some implementations are directed to a communication receiver that includes a time domain receive filter to provide a filtered output, the filtered output including colored noise. The receiver also includes a frequency domain, fractionally-spaced equalizer (FSE) unit to receive the filtered output from the receive filter. The FSE unit determines a separate weighting factor for each subcarrier, and the weighting factor is determined based on a noise variance of the subcarrier.

In other embodiments, a method includes filtering a received signal, via a time domain receive filter, to provide a filtered output, the filtered output including colored noise. The method further includes equalizing individual subcarriers of the filtered output via a frequency domain, fractionally-spaced equalizer (FSE) unit by determining a separate weighting factor for each subcarrier based on a noise variance of the subcarrier.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Previously, Fast Fourier Transform (FFT)-based frequency-domain equalization (FDE) for single carrier transmission based on fractionally-spaced equalization (T/2-spaced) has been proposed. The art, however, does not include a time-domain root-raised cosine filter (RRC) filter at the receiver in front of the equalizer, and thus the input to the equalizer includes "white" noise. Therefore, such an FDE method is not optimal when a dedicated time-domain RRC filter is located before the FDE. As such, what is needed is an optimal equalization method for general cases, including the cases where a dedicated time-domain RRC filter is included at the receiver. The embodiments described below take into account the different statistical characteristics of noise component due to a dedicated RRC filter.

Figure 1:
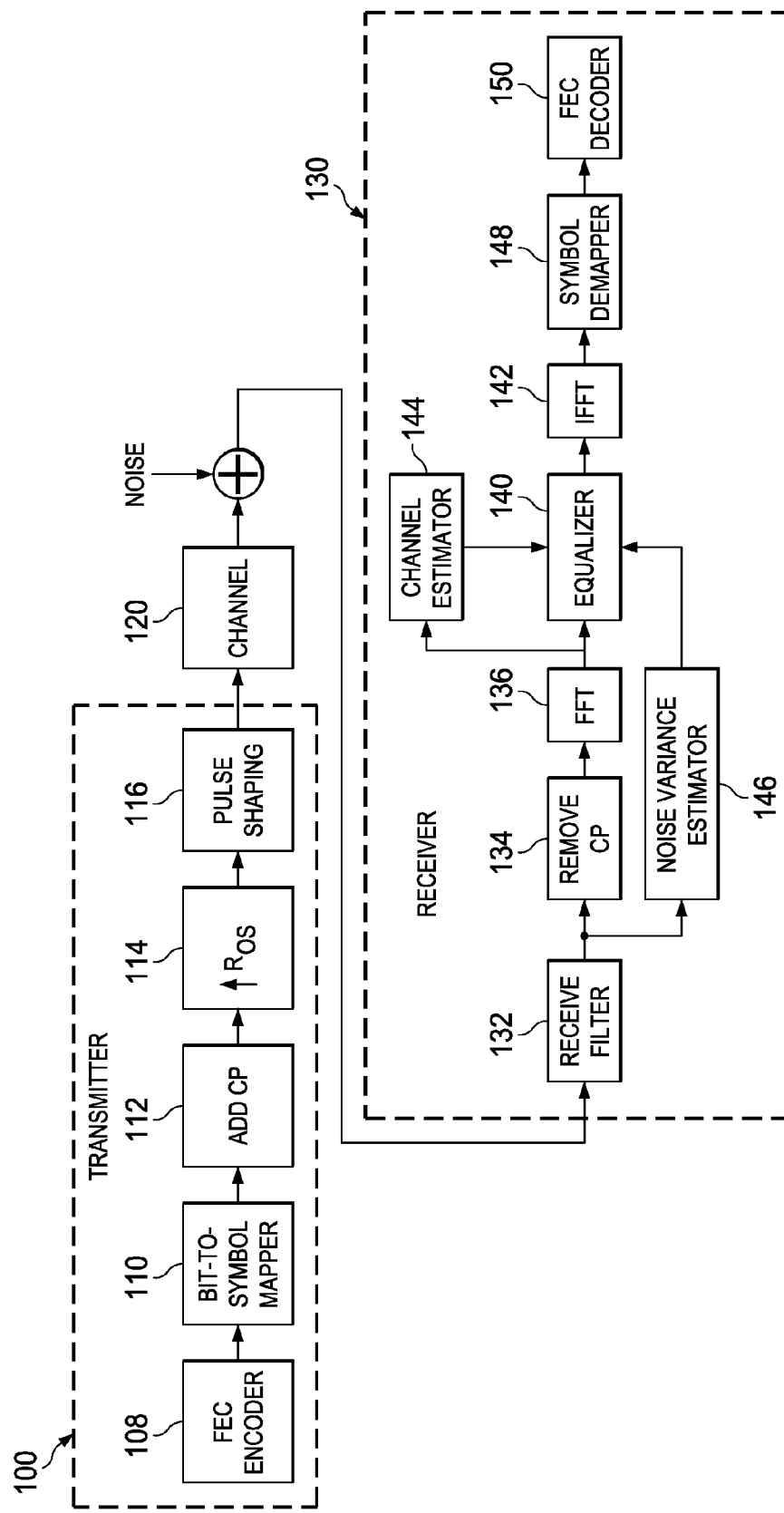
FIG. 1 is a block diagram illustrative of a system model for fractionally-spaced frequency-domain equalization for single-carrier transmission.

FIG. 1 shows an architecture for a communication system. The communication system in FIG. 1 includes a transmitter 100 in communication with a receiver 130 via a channel 120.

The transmitter 100 includes forward error correction code (FEC) encoder logic 108, bit-to-symbol mapper logic 110, add cyclic prefix (CP) logic 112, oversampling logic 114, and pulse shaping logic 116. The FEC logic 108 encodes the data bits for error correction/detection purposes. The FEC permits the receiver to correct/detect potential errors introduced during data transmission over the channel. The bit-to-symbol mapper logic 110 outputs symbols. Symbols refer to digitally modulated symbols in some embodiments. Illustrative applicable digital modulation techniques include phase shift keying (PSK), binary PSK (BPSK), quadrature PSK (QPSK), quadrature amplitude modulation (QAM), etc. The add CP logic 112 forms a block of size M and prepends a cyclic prefix of size $N_{CP}$ to each symbol block to avoid inter-block interference. The CP allows the linear convolution of a frequency-selective multipath channel to be modeled as a circular convolution. This in turn permits frequency-domain equalization to occur at the receiver. The upsampling logic 114 inserts zeros between symbols. An $R_{OS}$ upsampling factor is discussed herein. For a given ovesampling factor of $R_{OS}$ factor, $R_{OS}-1$ zeros are added between input symbols. The pulse shaping logic 116 may include a filter to shape the transmitted symbols as desired. For example, the pulse shaping logic 116 may include a root raised cosine filter.

The channel 120 may be wired or wireless, and generally is a frequency-selective multipath channel. The transmitted symbols may encounter noise as they are transmitted across the channel 120. The channel noise is modeled in FIG. 1 as noise added into the transmitted symbols.

As shown in the preferred embodiment of FIG. 1, the receiver 130 may include a receiver filter 132, remove CP logic 134, an FFT 136, an equalizer 140, an inverse FFT (IFFT) 142, a symbol demapper 148, and an FEC decoder 150. The FFT 136, equalizer 140, and IFFT 142 form an "FSE unit." In some embodiments, the FSE unit includes an $R_{OS} \times$ M-point FFT (M is block size) and an M-point IFFT. In such embodiments, the equalizer 140 performs an equalization function and a combine function as described below. In other embodiments, the FSE unit includes an ROS×M-point FFT and an $R_{OS} \times$M-point IFFT, also described below, with no combine function performed by the equalizer 140. The symbol demapper 148 calculates hard/soft bit information for each bit in an equalized symbol and the FEC decoder determines whether any bit errors are present and corrects for those errors.

The receiver 130 may also include a channel estimator 144 and a noise variance estimator 146. The output of the IFFT 142 may be further processed by additional hardware/software components (not shown) that perform additional functions such as determining the received symbols, forward error correction, etc.

The receive filter 132 preferably is implemented as a root raised cosine (RRC) filter, although other filter implementations are possible as well. The remove CP logic 134 removes the cyclic prefix from the received signal to form received signal blocks (each having a size of $R_{OS} \times M$ samples). The FFT 136 converts the received signal block into the frequency domain. The equalizer 140 performs equalization on the filtered received signal block in the frequency domain. As such, equalizer 140 preferably is implemented as a frequency-domain equalizer. The equalizer 140 may be performed as a processor executing software, or as a discrete circuit. The IFFT 142 converts the equalized frequency domain data back to the time domain. The communication system of FIG. 1 preferably is a single carrier system.

The following definitions are applicable to equations, provided below, that are implemented by the equalizer 140:

M: symbol block length (in symbols)

$s_k$: frequency-domain component (on subcarrier k) of the transmit symbol $E_s = E\{|s_k|^2\}$: average energy of transmit symbol β: bandwidth expansion factor (or rolloff factor) of the pulse-shaping filter (RRC filter)

$R_{os}$: oversampling factor with respect to symbol rate. That is, the sample rate for the input sample to the equalizer is $F_s = R_{os} F_{sym}$ (where $F_{sym}$ is the symbol rate).

$h_k$: frequency response of the composite channel between the transmit symbol generator and the equalizer input, including the transmit filters (e.g., pulse shaping filter 116), channel 120 and the receive filter 132 (if present).

$h_k^{RX}$: frequency response of the receive RRC filter. This will make the noise at the equalizer input "colored".

$w_k$: frequency-domain noise component on subcarrier k

The receive filter 132 (e.g. RRC filter) preferably is included in the receiver 130 but before the FFT 136. Thus, the input to the FFT 136 is a "colored" signal meaning that, because the noise component has been filtered, the noise is no longer white noise. The equalizer 140 accounts for the frequency response of the receive filter in the weightings it determines for each subcarrier.

The FFT 136 preferably is an $R_{OS}$M-point FFT and the IFFT preferably is an M-point FFT. In an example in which $R_{OS}$ is 2 and M is 64, the FFT is a 128-point FFT and the IFFT is a 64-point FFT.

In (discrete-time) frequency-domain representation (at resolution that can be achievable with $R_{os}$M-length discrete Fourier transform), the received signal at the output of the FFT 146 (size of FFT is $R_{OS} \times M$) and input to the equalizer 140 can be model as follows:

Passband:

$y_k = h_k s_k + w_k$, for $k \leq k_1$ or $k > k_4$

Figure 2:
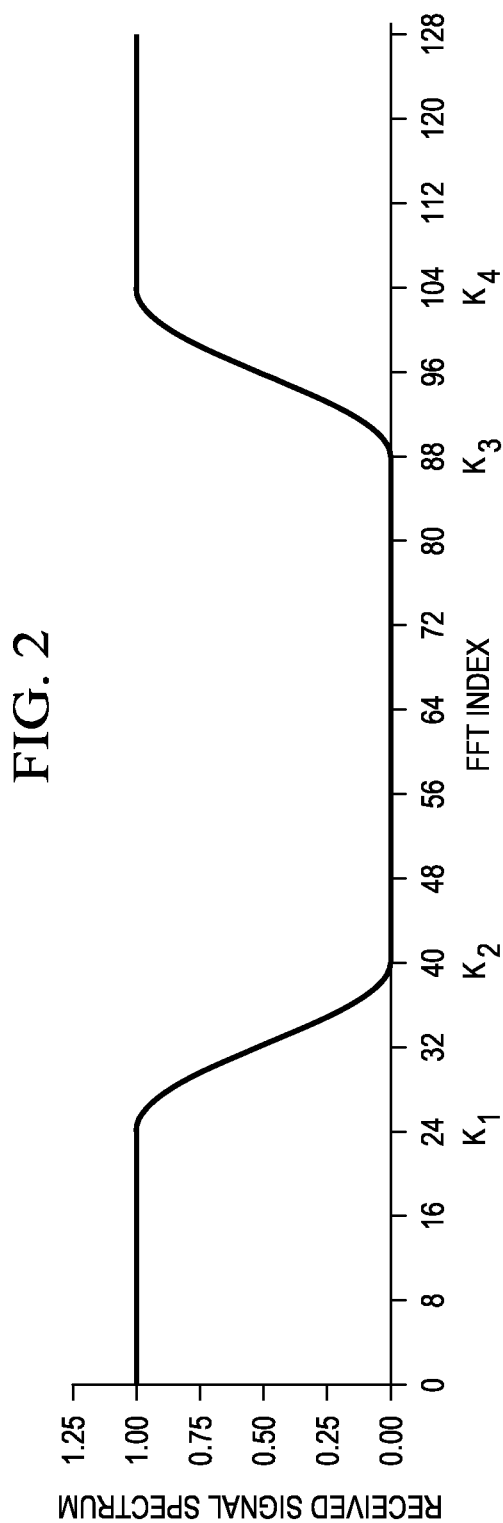
FIG. 2 illustrates an example of a received signal frequency spectrum in an additive white Gaussian noise (AWGN) channel.

Transition band:

$$\begin{bmatrix} y_k \\ y_{k+\Delta} \end{bmatrix} = \begin{bmatrix} h_k \\ h_{k+\Delta} \end{bmatrix} s_k + \begin{bmatrix} w_k \\ w_{k+\Delta} \end{bmatrix},$$

for $k_1 < k \leq k_2$ where:

$k \in [0, 1, \ldots, R_{os}M-1]$: index for subcarrier in $R_{os}$M-sized FFT $k_1 = \lfloor (1-\beta)M/2 \rfloor$ $k_2 = \lfloor (1+\beta)M/2 \rfloor$ $k_3 = \lfloor (2R_{os}-1-\beta)M/2 \rfloor$ $k_4 = \lfloor (2R_{os}-1+\beta)M/2 \rfloor$ $\Delta = (R_{os}-1)M$ FIG. 2 illustrates the received signal spectrum in AWGN channel for explanation for the following illustrative set of values:

M=64

$R_{OS}$=2

β=0.25

Based on these values, then $k_1$, $k_2$, $k_3$, $k_4$, and Δ are computed as:

$k_1 = \lfloor (1-\beta)M/2 \rfloor = 24$ $k_2 = \lfloor (1+\beta)M/2 \rfloor = 40$ $k_3 = \lfloor (2R_{os}-1-\beta)M/2 \rfloor = 88$ $k_4 = \lfloor (2R_{os}-1+\beta)M/2 \rfloor = 104$ $\Delta = (R_{os}-1)M = 64$ For the subcarrier in the transition band, two subcarriers that carry the same frequency-component preferably are combined in an optimal manner. Then, the combined frequency-domain signal can be transformed to symbol-rate, time-domain samples using the IFFT 142 (M-point IFFT).

In accordance with various embodiments, the equalizer 140 weights each subcarrier frequency component based on, at least in part, the noise variance of each such subcarrier. The weights are also determined based on the frequency response for that subcarrier of the channel 120 and receive filter 132.

Referring to the spectrum of FIG. 2, the passband includes FFT index values between 0 and $k_1$, that is $0 \leq k \leq k_1$. For the passband, each subcarrier signal $y_k$ is weighted as follows:

$$\hat{s}_k = \frac{E_s \frac{h_k^*}{\sigma_k^2}}{E_s \frac{|h_k|^2}{\sigma_k^2} + 1}$$

$$y_k = \frac{h_k^*}{|h_k|^2 + \frac{\sigma_k^2}{E_s}} y_k$$

where $\sigma_k^2 = E\{|w_k|^2\}$ is the noise variance for a subcarrier of index k and, as noted above, $E_s$ is the average energy of a transmit symbol on index k and $h_k$ is the frequency response of the combination of at least a transmit filter (e.g., the pulse shaping filter 116), the channel 120, and receive filter 132. The noise variance values are generated by the noise variance estimator 146 based on the output of the receiver filter 132, although other techniques are possible as well for generating the noise variance values. The noise variance on each subcarrier may be estimated for each subcarrier or may be predetermined based on noise power level from an analog front-end and the received filter (which may be predetermined and known to the receiver). The values of $h_k$ are generated by the channel estimator 144 and provided to the equalizer 140 as shown in FIG. 1.

For $k_2 < k \le M-1$, the equalizer uses signal at the subcarrier at index $k+\Delta$. The equation implemented by the equalizer is:

$$\hat{s}_k = \frac{E_s \frac{h^*_{k+\Delta}}{\sigma^2_{k+\Delta}}}{E_s \frac{|h_{k+\Delta}|^2}{\sigma^2_{k+\Delta}} + 1}$$

$$y_{k+\Delta} = \frac{h^*_{k+\Delta}}{|h_{k+\Delta}|^2 + \frac{\sigma^2_{k+\Delta}}{E_s}} y_{k+\Delta}$$

Thus the subcarriers are decimated via the frequency domain processing.

The transition band is between $k_1$ and $k_2$, that is, $k_1 < k \le k_2$. The equalizer 140 determines a weight for a subcarrier at index k and applies (e.g., multiplies) that weight to the subcarrier at index k. The equalizer 140 also determines a weight for a subcarrier $k+\Delta$ and applies that weight as well to the subcarrier signal at $k+\Delta$. The equalizer then sums together to the weighted subcarrier signals at k and $k+\Delta$. The computation for equalizing and combining subcarriers in the transition band is:

$$\hat{s}_k = \frac{E_s \frac{h^*_k}{\sigma^2_k}}{E_s \left( \frac{|h_k|^2}{\sigma^2_k} + \frac{|h_{k+\Delta}|^2}{\sigma^2_{k+\Delta}} \right) + 1} y_k + \frac{E_s \frac{h^*_{k+\Delta}}{\sigma^2_{k+\Delta}}}{E_s \left( \frac{|h_k|^2}{\sigma^2_k} + \frac{|h_{k+\Delta}|^2}{\sigma^2_{k+\Delta}} \right) + 1} y_{k+\Delta}$$

When the receiver filter (132 in FIG. 1) is represented by a filter impulse response $\tilde{h}^{RX} = [\tilde{h}^{RX}[0], \tilde{h}^{RX}[1], \ldots, \tilde{h}^{RX}[L-1]]$ and the time-domain noise ("noise" in FIG. 1) has variance $\sigma_{\tilde{w}}^2$, the noise variance of the frequency-domain noise sample on each subcarrier at the output of $R_{os}M$-point FFT can be obtained as follows:

The covariance matrix of the frequency-domain noise samples $w = [w_0, w_1, \ldots, w_{R_{os}M-1}]^T$ (where $w_k$ is frequency-domain noise component on subcarrier k) is given as:

$$R_w := E\{ww^H\} = \sigma_{\tilde{w}}^2 FHH^H F^H$$

where F is the $R_{os}M \times R_{os}M$ matrix representing $R_{os}M$-point DFT operation, i.e., its (k,n) element is $$\frac{1}{\sqrt{R_{os}M}} \exp\left(-\frac{j2\pi kn}{R_{os}M}\right);$$

and
H is a $(R_{os}M \times (R_{os}M+L-1))$ matrix given as:

$$H = \begin{bmatrix} \tilde{h}^{RX}[L-1] & \tilde{h}^{RX}[L-2] & \ldots & \tilde{h}^{RX}[0] & 0 & 0 & \ldots & 0 \\ 0 & \tilde{h}^{RX}[L-1] & \tilde{h}^{RX}[L-2] & \ldots & \tilde{h}^{RX}[0] & 0 & \ldots & 0 \\ \vdots & \vdots & \ldots & \ldots & \vdots & \ldots & \ldots & 0 \\ 0 & \ldots & 0 & 0 & \tilde{h}^{RX}[L-1] & \tilde{h}^{RX}[L-2] & \ldots & \tilde{h}^{RX}[0] \end{bmatrix}$$

Then, the noise variance on the subcarrier at index k is given by $$\sigma_k^2 = R_w(k,k)$$

where $R_w(k,k)$ represents the (k,k) element of the covariance matrix $R_w$.

The following is an alternative implementation from that described above. The passband and transition band computations by the equalizer are as follows:

Passband:

for $0 \le k \le k_1$ or $k_2 < k \le R_{os}M-1$ $$\hat{s}_k = \frac{E_s \frac{h^*_k}{\sigma^2_k}}{E_s \frac{|h_k|^2}{\sigma^2_k} + 1}$$

$$y_k = \frac{h^*_k}{|h_k|^2 + \frac{\sigma^2_k}{E_s}} y_k$$

Transition band:
for $k_1 < k \le k_2$ (a first transition band):

$$\hat{s}_k = \frac{E_s \frac{h^*_k}{\sigma^2_k}}{E_s \left( \frac{|h_k|^2}{\sigma^2_k} + \frac{|h_{k+\Delta}|^2}{\sigma^2_{k+\Delta}} \right) + 1} y_k$$

For $k_3 < k \le k_4$ (a second transition band):

$$\hat{s}_k = \frac{E_s \frac{h^*_k}{\sigma^2_k}}{E_s \left( \frac{|h_k|^2}{\sigma^2_k} + \frac{|h_{k-\Delta}|^2}{\sigma^2_{k-\Delta}} \right) + 1} y_k$$

In this alterative implementation, the equalized frequency domain samples $\{\hat{s}_k, k=0, 1, \ldots, R_{os}M-1\}$ are transformed using an $R_{os}M$-IFFT as the IFFT 142 into time-domain samples. The time-domain samples as then decimated (i.e., downsampled) by decimation factor of $R_{os}$ to generate symbol-rate samples.

Zero-Forcing

The equalizer 140 alternatively may be implemented as a zero forcing equalizer. In that case, the following equations are implemented by the equalizer:

Passband:

$0 \leq k \leq k_1$ or $k_2 < k \leq M-1$ $$\hat{s}_k = \frac{h_k^*}{|h_k|^2} y_k$$

For $k_2 < k \leq M-1$, $$\hat{s}_k = \frac{h_{k+\Delta}^*}{|h_{k+\Delta}|^2} y_{k+\Delta}$$

Transition band:

$k_1 < k \leq k_2$ $$\hat{s}_k = \frac{h_k^*}{|h_k|^2 + |h_{k+\Delta}|^2} y_k + \frac{h_{k+\Delta}^*}{|h_k|^2 + |h_{k+\Delta}|^2} y_{k+\Delta}$$

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication receiver, comprising:
   a time domain receive filter to provide a filtered output, the filtered output including colored noise; and
   a frequency domain, fractionally-spaced equalizer (FSE) unit to receive the filtered output from the receive filter, the FSE unit determines a separate weighting factor for each subcarrier, the weighting factor is determined based on a noise variance of the subcarrier, wherein for a portion of a passband, the FSE equalizes a subcarrier as:

$$\hat{s}_k = \frac{h_k^*}{|h_k|^2 + \frac{\sigma_k^2}{E_s}} y_k$$

where $h_k$ a frequency response on subcarrier k of a composite channel including a transmit filter, a communication channel and the receive filter, $\sigma_k^2$ is the noise variance for subcarrier k, $E_s$ is the average energy of a transmit symbol, $y_k$ is a received frequency-domain signal on subcarrier k and $\hat{s}_k$ is the equalized signal on subcarrier k.

2. The communication receiver of claim 1 wherein the weighting factor also is determined based on a specific subcarrier's frequency response value for a composite channel including a transmit filter, a communication channel and the receive filter.

3. The communication receiver of claim 1 wherein for another portion of the passband, the FSE equalizes a subcarrier as:

$$\hat{s}_k = \frac{h_{k+\Delta}^*}{|h_{k+\Delta}|^2 + \frac{\sigma_{k+\Delta}^2}{E_s}} y_{k+\Delta}$$

where $\Delta$ is a fixed value based on an oversampling factor $R_{OS}$ and a block length.

4. The communication receiver of a claim 3 wherein for a transition band, the FSE unit equalizes subcarriers as:

$$\hat{s}_k = \frac{E_s \frac{h_k^*}{\sigma_k^2}}{E_s \left( \frac{|h_k|^2}{\sigma_k^2} + \frac{|h_{k+\Delta}|^2}{\sigma_{k+\Delta}^2} \right) + 1} y_k + \frac{E_s \frac{h_{k+\Delta}^*}{\sigma_{k+\Delta}^2}}{E_s \left( \frac{|h_k|^2}{\sigma_k^2} + \frac{|h_{k+\Delta}|^2}{\sigma_{k+\Delta}^2} \right) + 1} y_{k+\Delta}.$$

5. The communication receiver of claim 4 wherein the FSE unit includes a Fast Fourier Transform (FFT), equalize logic, and an inverse FFT (IFFT), wherein the FFT is an $R_{OS} \times M$-point FFT and the IFFT is an M-point IFFT, where M is the symbol block length.

6. The communication receiver of claim 1 wherein the noise variance accounts for spectrum changes in the subcarrier caused by the receive filter.

7. The communication receiver of claim 1 wherein the noise variance on each subcarrier is predetermined based on noise power level from an analog front-end and the time domain receive filter.

8. The communication receiver of claim 7 further using a noise variance for each subcarrier determined by a diagonal element of the following covariance matrix:

$$R_{\tilde{w}} = \sigma_{\tilde{w}}^2 F H H^H F^H$$

where $\sigma_{\tilde{w}}^2$ is the noise variance of the time-domain noise sample in received samples, F is the $R_{OS}M \times R_{OS}M$ matrix representing $R_{OS}M$-point discrete Fourier Transform (DFT) operation, $R_{OS}$ is a sampling factor, M is block size, and H is a $R_{OS}M \times (R_{OS}M+L-1)$ matrix determined by the filter impulse response of the receive filter.

9. The communication receiver of claim 1 further comprising a noise variance estimator to provide an estimate of noise variance for each subcarrier to the FSE unit.

10. A communication receiver, comprising:
    a time domain receive filter to provide a filtered output, the filtered output including colored noise; and
    a frequency domain, fractionally-spaced equalizer (FSE) unit to receive the filtered output from the receive filter, the FSE unit determines a separate weighting factor for each subcarrier, the weighting factor is determined based on a noise variance of the subcarrier, wherein for a passband, the FSE unit equalizes subcarriers as:

$$\hat{s}_k = \frac{h_k^*}{|h_k|^2 + \frac{\sigma_k^2}{E_s}} y_k$$

where $h_k$ is a frequency response on subcarrier k of a composite channel including a transmit filter, a communication channel and the receive filter, $\sigma_k^2$ is the noise variance for subcarrier k, $E_s$ is the average energy of a transmit symbol, $y_k$ is a received frequency-domain signal on subcarrier k and $\hat{s}_k$ is the equalized signal on subcarrier k.

11. The communication receiver of claim 10 wherein the receiver includes a downsampler, said downsampler downsampling by a factor of $R_{OS}$.

12. The communication receiver of claim 11 wherein for a first transition band, the FSE unit equalizes subcarriers as:

$$\hat{s}_k = \frac{E_s \frac{h_k^*}{\sigma_k^2}}{E_s\left(\frac{|h_k|^2}{\sigma_k^2} + \frac{|h_{k+\Delta}|^2}{\sigma_{k+\Delta}^2}\right) + 1} y_k$$

where $\Delta$ is a fixed value based on the oversampling factor $R_{OS}$ and a block length.

13. The communication receiver of claim 12 wherein for a second transition band, the FSE unit equalizes subcarriers as:

$$\hat{s}_k = \frac{E_s \frac{h_k^*}{\sigma_k^2}}{E_s\left(\frac{|h_k|^2}{\sigma_k^2} + \frac{|h_{k-\Delta}|^2}{\sigma_{k-\Delta}^2}\right) + 1} y_k.$$

14. The communication receiver of claim 13 wherein the FSE unit includes a Fast Fourier Transform (FFT), equalize logic, and an inverse FFT (IFFT), wherein the FFT is an $R_{OS} \times M$-point FFT and the IFFT is an $R_{OS} \times M$-point IFFT, where M is a block size.

15. The communication receiver of claim 10 wherein the weighting factor also is determined based on a specific subcarrier's frequency response value for a composite channel including a transmit filter, a communication channel and the receive filter.

16. The communication receiver of claim 10 wherein the noise variance accounts for spectrum changes in the subcarrier caused by the receive filter.

17. The communication receiver of claim 10 wherein the noise variance on each subcarrier is predetermined based on noise power level from an analog front-end and the time domain receive filter.

18. The communication receiver of claim 10 further comprising a noise variance estimator to provide an estimate of noise variance for each subcarrier to the FSE unit.

19. A method, comprising:
 filtering, via a time domain receive filter, a received signal to provide a filtered output, the filtered output including colored noise; and
 equalizing individual subcarriers of the filtered output via a frequency domain, fractionally-spaced equalizer (FSE) unit by determining a separate weighting factor for each subcarrier based on a noise variance of the subcarrier and a specific subcarrier's frequency response value for a composite channel including a transmit filter, a communication channel and the receive filter, wherein for a passband, equalizing comprises computing:

$$\hat{s}_k = \frac{h_k^*}{|h_k|^2 + \frac{\sigma_k^2}{E_s}} y_k$$

where $h_k$ is a frequency response on subcarrier k of a composite channel including a transmit filter, a communication channel and the receive filter, $\sigma_k^2$ is the noise variance for subcarrier k, $E_s$ is the average energy of a transmit symbol, $y_k$ is a received frequency-domain signal on subcarrier $\hat{s}_k$ and is the equalized signal on subcarrier k.

20. The method of claim 19 further comprising applying the weighting factor for a given subcarrier to a signal on that particular subcarrier.

21. The method of claim 19 wherein for another portion of the passband, equalizing comprises computing:

$$\hat{s}_k = \frac{h_{k+\Delta}^*}{|h_{k+\Delta}|^2 + \frac{\sigma_{k+\Delta}^2}{E_s}} y_{k+\Delta}$$

where $\Delta$ is a fixed value based on an oversampling factor $R_{OS}$ and a block length.

22. The method of claim 21 wherein for a transition band, equalizing comprises computing:

$$\hat{s}_k = \frac{E_s \frac{h_k^*}{\sigma_k^2}}{E_s\left(\frac{|h_k|^2}{\sigma_k^2} + \frac{|h_{k+\Delta}|^2}{\sigma_{k+\Delta}^2}\right) + 1} y_k + \frac{E_s \frac{h_{k+\Delta}^*}{\sigma_{k+\Delta}^2}}{E_s\left(\frac{|h_k|^2}{\sigma_k^2} + \frac{|h_{k+\Delta}|^2}{\sigma_{k+\Delta}^2}\right) + 1} y_{k+\Delta}.$$

23. The method of claim 22 further comprising performing an $R_{OS} \times M$-point Fast Fourier Transform (FFT) and an M-point inverse FFT (IFFT), where M is the block length.

24. The method of claim 23 further comprising downsampling by the oversampling factor $R_{OS}$.

25. The method of claim 24 wherein for a first transition band, equalizing comprises computing:

$$\hat{s}_k = \frac{E_s \frac{h_k^*}{\sigma_k^2}}{E_s\left(\frac{|h_k|^2}{\sigma_k^2} + \frac{|h_{k+\Delta}|^2}{\sigma_{k+\Delta}^2}\right) + 1} y_k$$

$\Delta$ is a fixed value based on the oversampling factor $R_{OS}$ and the block length.

26. The method of claim 25 wherein for a second transition band, equalizing comprises computing:

$$\hat{s}_k = \frac{E_s \frac{h_k^*}{\sigma_k^2}}{E_s\left(\frac{|h_k|^2}{\sigma_k^2} + \frac{|h_{k-\Delta}|^2}{\sigma_{k-\Delta}^2}\right) + 1} y_k.$$

27. The method of claim 26 further comprising performing an $R_{OS} \times M$-point Fast Fourier Transform (FFT) and an $R_{OS} \times M$-point inverse FFT (IFFT), where M is the block length.

28. The method of claim 19 wherein the noise variance accounts for spectrum changes in the subcarrier caused by the receive filter.

29. A method, comprising:
 filtering, via a time domain receive filter, a received signal to provide a filtered output, the filtered output including colored noise; and
 equalizing individual subcarriers of the filtered output via a frequency domain, fractionally-spaced equalizer (FSE) unit by determining a separate weighting factor for each subcarrier based on a noise variance of the subcarrier wherein for a passband, equalizing comprises computing:

$$\hat{s}_k = \frac{h_k^*}{|h_k|^2 + \frac{\sigma_k^2}{E_s}} y_k$$

where $h_k$ is a frequency response on subcarrier k of a composite channel including a transmit filter, a communication channel and a receive filter, $\sigma_k^2$ is the noise variance for subcarrier k, $E_s$ is the average energy of a transmit symbol, $\Delta$ is a fixed value based on the oversampling factor $R_{OS}$ and a block length, $y_k$ is a received frequency-domain signal on subcarrier k and $\hat{s}_k$ is the equalized signal on subcarrier k.

30. The method of claim 29 further comprising applying the weighting factor for a given subcarrier to a signal on that particular subcarrier.

31. A method, comprising:
filtering, via a time domain receive filter, a received signal to provide a filtered output, the filtered output including colored noise; and
equalizing individual subcarriers of the filtered output via a frequency domain, fractionally-spaced equalizer (FSE) unit by determining a separate weighting factor for each subcarrier based on a noise variance of the subcarrier further using a noise variance for each subcarrier determined by a diagonal element of the following covariance matrix:

$$R_w := \sigma_{\tilde{w}}^2 F H H^H F^H$$

where $\sigma_{\tilde{w}}^2$ is the noise variance of the time-domain noise sample in received samples, F is the $R_{OS}M \times R_{OS}M$ matrix representing $R_{OS}M$-point discrete Fourier Transform (DFT) operation, $R_{OS}$ is a sampling factor, M is block size, and H is a $R_{OS}M \times (R_{OS}M+L-1)$ matrix determined by the filter impulse response of the receive filter.

32. The method of claim 31 further comprising applying the weighting factor for a given subcarrier to a signal on that particular subcarrier.

* * * * *